(12) United States Patent
Phillips

(10) Patent No.: US 8,157,895 B2
(45) Date of Patent: Apr. 17, 2012

(54) SYSTEM FOR REDUCING HEAD SPACE IN A PRESSURE CYCLONE

(75) Inventor: William E. Phillips, Houston, TX (US)

(73) Assignee: Kellogg Brown & Root LLC, Houston, TX (US)

( * ) Notice: Subject to any disclaimer, the term of this patent is extended or adjusted under 35 U.S.C. 154(b) by 179 days.

(21) Appl. No.: 12/773,206

(22) Filed: May 4, 2010

(65) Prior Publication Data

US 2011/0271836 A1 Nov. 10, 2011

(51) Int. Cl.
*B01D 45/12* (2006.01)
(52) U.S. Cl. ............... 95/271; 95/269; 95/267; 55/337; 55/435; 55/434.1; 55/459.1; 55/459.5
(58) Field of Classification Search ............... 55/459.1, 55/459.5, 435, 337, 434.1; 95/271, 269, 95/267
See application file for complete search history.

(56) References Cited

U.S. PATENT DOCUMENTS

| | | |
|---|---|---|
| 2,672,215 A | 3/1954 | Schmid |
| 2,741,973 A | 4/1956 | Swor |
| 3,273,320 A | 9/1966 | Delaune et al. |
| 3,327,456 A | 6/1967 | Guber, Jr. et al. |
| 3,470,678 A | 10/1969 | Clark et al. |
| 3,802,570 A | 4/1974 | Dehne |
| 4,125,385 A | 11/1978 | Rado et al. |
| 4,245,965 A | 1/1981 | Brown |
| 4,455,220 A | 6/1984 | Parker et al. |
| 4,502,947 A | 3/1985 | Haddad et al. |
| 4,664,889 A | 5/1987 | Steenge et al. |
| 4,687,497 A | 8/1987 | Owen et al. |
| 4,692,311 A | 9/1987 | Parker et al. |
| 4,741,883 A | 5/1988 | Haddad et al. |
| 4,778,488 A | 10/1988 | Koers |
| 4,820,404 A | 4/1989 | Owen |
| 5,186,836 A | 2/1993 | Gauthier et al. |
| 5,376,339 A | 12/1994 | Castagnos, Jr. et al. |
| 5,569,435 A | 10/1996 | Fusco et al. |
| 5,868,809 A | 2/1999 | Heard |
| 5,869,008 A | 2/1999 | Dewitz |
| 6,296,812 B1 | 10/2001 | Gauthier et al. |
| 6,361,576 B1 | 3/2002 | Andriola |
| 7,128,827 B2 | 10/2006 | Tallman et al. |
| 7,160,518 B2 | 1/2007 | Chen et al. |
| 7,179,428 B2 | 2/2007 | Dries |
| 7,491,315 B2 | 2/2009 | Eng et al. |
| 2006/0049082 A1 | 3/2006 | Niccum et al. |
| 2010/0025295 A1 | 2/2010 | Mehlberg |
| 2010/0025305 A1 | 2/2010 | Mehlberg |

FOREIGN PATENT DOCUMENTS

EP 0 094 098 11/1983

*Primary Examiner* — Jason M Greene
*Assistant Examiner* — Dung H Bui
(74) *Attorney, Agent, or Firm* — KBR IP Legal Dept.

(57) ABSTRACT

A pressure cyclone is disclosed having a concave top head, wherein the concave top head has a substantially flat roof disposed in the interior of the cyclone vessel. An inlet is tangentially-coupled to the vessel and has an inlet nozzle disposed therein and configured to smoothly transition into the cyclone vessel to create a vortex that separates solid particulates from an incoming particulate-fluid suspension. In particular, the one surface of the inlet nozzle is tangent to the inner surface of cyclone vessel and another surface of the inlet nozzle is parallel and continuous with the substantially flat roof. An inlet casing is disposed around a length of the inlet nozzle and configured to transition from a circular casing to an elliptical casing along the length of the inlet nozzle, and couple to the vessel with the elliptical casing.

15 Claims, 5 Drawing Sheets ed States Patent

SYSTEM FOR REDUCING HEAD SPACE IN A PRESSURE CYCLONE

BACKGROUND OF THE INVENTION

1. Field of the Invention

Embodiments of the present invention generally relate to cyclonic separation units. More particularly, embodiments of the present invention relate to high-pressure cyclones having a concave, or inverted top head.

2. Description of the Related Art

Cyclonic separation involves separating a mixture of two or more phases, for example, fluid-particulate suspensions wherein one or more solid particulates are suspended in a carrier fluid, under a centrifugal force generated by centripetal motion. A cyclone separator is the mechanical device typically used to carry out cyclonic separation processes. In normal cyclone separator operation, a particulate suspension is introduced into the top of the cyclone separator via a tangential inlet where the solid particles tend to collect on the inner surface of the separator and its fluidic counterpart is entrained into a vortex. The solid particles gradually fall to the bottom of the separator vessel for further processing, while the fluidic counterpart is eventually drawn through a centrally-located output tube. Uses of cyclonic separation methods can include unit operations to purify a phase, to concentrate a phase, to terminate chemical and physical interactions between mixed phases, or combinations thereof.

In applications exhibiting high and ultrahigh pressures, cyclonic separation operations are typically undertaken by a pressure cyclone separator. Pressure cyclones generally consist of a compression-proof vessel that is geometrically and structurally designed to resist elevated pressures and temperatures. However, it is nonetheless not unheard of to employ pressure cyclones in low-pressure environments. In practice, a pressure cyclone can be manufactured to almost any size or dimension to fit any particular separation application.

At least one high-pressure application that is appropriate for a pressure cyclone includes hydrocarbon gasification processes, where carbonaceous materials, such as coal, petroleum, crude oil, tars, biofuel, or biomass, are converted into a "syngas," such as carbon monoxide and hydrogen. Depending on the hydrocarbon used and the conversion process employed, pressures in a hydrocarbon gasification process can range from about 50 psi to about 1,000 psi, and even up to ultrahigh pressures of about 7,000 psi. Because of these potentially-extreme conditions, the structural design of pressure cyclones is a vital concern if it is to endure a long production life.

The top head and tangential inlet of the pressure cyclone are key components in improving the overall efficiency of high-pressure cyclonic separation processes. In prior applications, the top head has been designed as a flat surface near the inlet entrance, thereby creating joints and edges reflecting a significant propensity to fail under elevated pressures and temperatures. Prior applications have implemented a semispherical, convex top head to take advantage of the structural integrity of an arced surface in order to withstand the elevated pressures. However, the convex top head design essentially creates a void area between the tangential inlet and the top head where the vortex can be significantly disturbed, thereby resulting in a significant reduction in efficiency of the separation process.

Likewise, the casing surrounding the tangential inlet has often been designed with square or rectangular features that also have a tendency to fail or crack under extreme conditions. In applications using a continuously-circular inlet casing, the inlet nozzle is oftentimes required to be shifted into direct or semi-direct alignment with a centrally-located vortex output tube, thereby injecting particulate matter directly at the output tube which prematurely erodes its surface and disturbs the vortex. To remedy this, some designs have implemented a bend in the output tube, thereby placing it off-center from the vortex and effectively reducing the efficiency of the process.

What is needed, therefore, is an improved top head design and tangential inlet for pressure cyclones that can withstand elevated pressures and maintain or increase process efficiency.

BRIEF DESCRIPTION OF THE DRAWINGS

So that the recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with publicly available information and technology.

Figure 1:
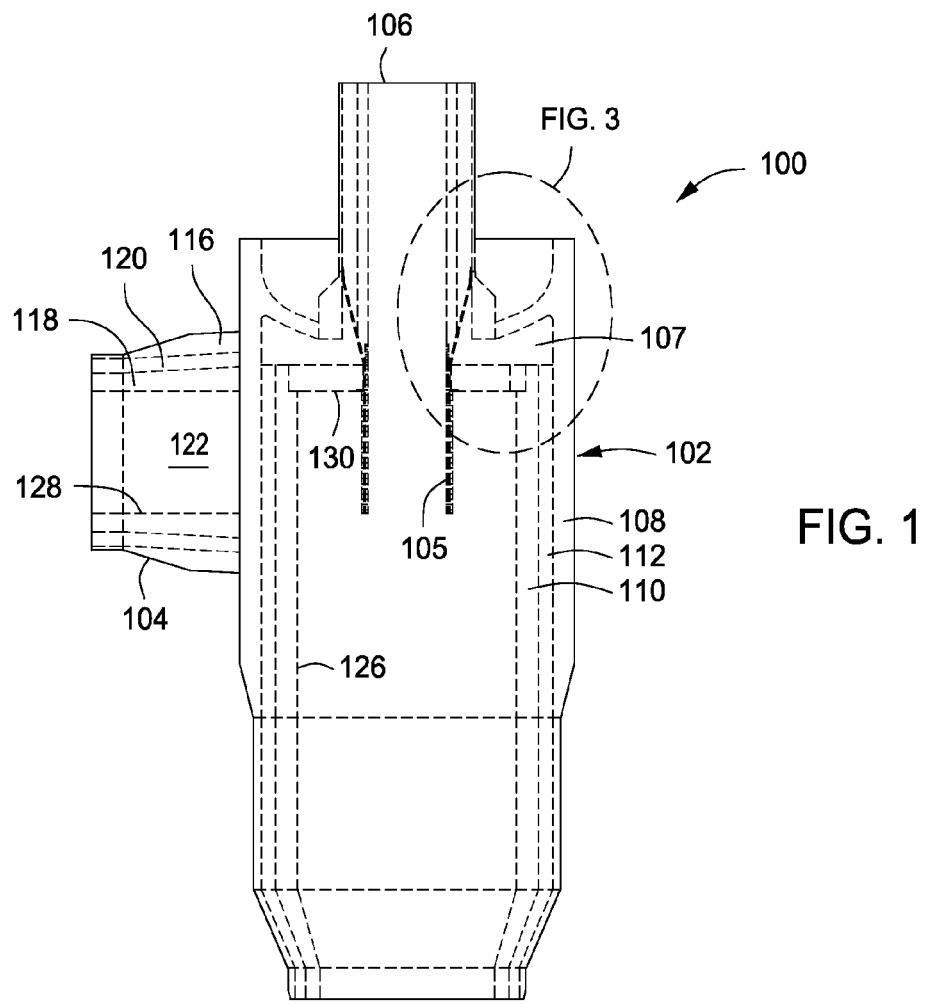
FIG. 1 depicts a side view of an exemplary cyclone, according to one or more embodiments of the disclosure.
Figure 2:
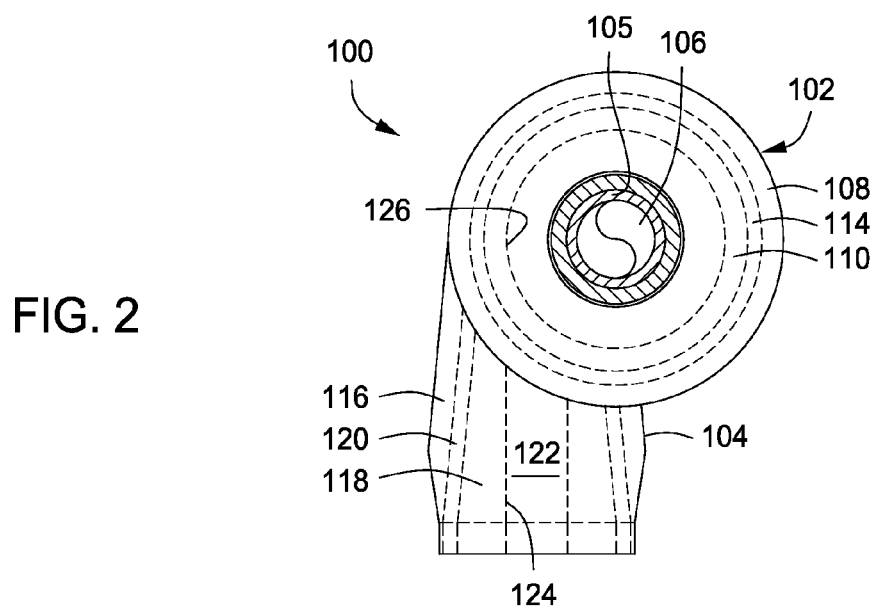
FIG. 2 depicts a top view of the exemplary cyclone of FIG. 1, according to one or more embodiments of the disclosure.

FIGS. 1 and 2 depict an exemplary cyclone 100, according to one or more embodiments of the present disclosure. FIG. 1 depicts a side view of the exemplary cyclone 100, while FIG. 2 depicts an end view of the same. In an exemplary embodiment, the cyclone 100 can be configured as a pressure cyclone as used in high-pressure cyclonic separation applications. In at least one embodiment, one high-pressure cyclonic separation application can include hydrocarbon gasification processing. However, the exemplary cyclone 100 can be equally effective in low-pressure applications, such as fluid catalytic cracking units where catalyst particles are cyclonically-separated from a hydrocarbon vapor suspension.

As illustrated, the cyclone 100 can include a cyclone vessel 102 generally defining a cylindrical structure having an inlet 104 and an outlet 106, where the outlet 106 includes an outlet tube 105 configured to sealingly penetrate a top head 107. In at least one embodiment, the cyclone vessel 102 can be configured as a pressure-vessel enabled to withstand elevated pressures and temperatures in cyclonic separation processes. The cyclone vessel 102 can include a vessel casing 108, an erosion resistant layer 110, and an insulating layer 112 interposed between the vessel casing 108 and the erosion resistant layer 110. In one or more embodiments, the vessel casing 108 can generally define the outside surface of the cyclone vessel 102, while the erosion resistant layer 110 generally defines an inner cylindrical surface 126.

The vessel casing 108 can be made of, for example, carbon steel, such as a low-alloy steel, but can also be manufactured of other materials having similar strength characteristics as carbon steel. The erosion resistant layer 110 can include a dense layer refractory material, either a pressed or monolithic refractory, configured to protect the adjacent insulating layer 112 and provide a surface 126 where solid particulate can collect, as will be described below. In at least one embodiment, the erosion resistant layer 110 can be made of RESCO® RS-88VC refractory material (Resco Products, Inc.), and can be installed by vibracasting techniques.

The insulating layer 112 can serve as a back-up refractory layer, but more importantly can provide an insulating material for the cyclone vessel 102. In at least one embodiment, the insulating layer 112 can include a thermal ceramic, such as KAOLITE® 2300 LI thermal ceramic (Thermal Ceramics, Inc.), and can be installed by casting techniques. The insulating layer 112 can be configured to withstand elevated temperatures of around 1800° F.

As best illustrated in FIG. 2, the inlet 104 can be tangentially-disposed on the cyclone vessel 102 and include an inlet casing 116, an inlet erosion resistant layer 118, and an inlet insulating layer 120 interposed between the inlet casing 116 and the inlet erosion resistant layer 118. As will be described in more detail below, the inlet casing 116 can be substantially cylindrical along its length, but gradually tapering or transitioning along its length into an elliptical or oval-like conduit as it eventually intersects the vessel casing 108. In at least one embodiment, the inlet 104 can be welded to the cyclone vessel 102 to ensure a pressure-tight interconnection. In other exemplary embodiments, the inlet 104 can be mechanically coupled or otherwise attached to the cyclone vessel 102, while maintaining a pressure-resistant interconnection.

In an exemplary embodiment, the inlet casing 116 can be made of carbon steel, such as low-alloy steel. Similar to the erosion resistant layer 110, the inlet erosion resistant layer 118 can include a dense layer refractory material, such as RESCO® RS-88VC refractory material, and can be installed by vibracasting techniques, as known in the art. The inlet insulating layer 120 can serve as a back-up refractory layer to the inlet erosion resistant layer 118 and also provide insulation along the length of the inlet 104. In at least one embodiment, the inlet insulating layer 120 can include a thermal ceramic, such as KAOLITE® 2500 LI (Thermal Ceramics, Inc.), and can be installed by gunning techniques, as known in the art.

An inlet nozzle 122 can be defined in and generally centered along the length of the inlet 104 toward the cyclone vessel 102. In at least one embodiment, the inlet nozzle 122 can be rectangular in shape, having a first surface 124 substantially tangent to and continuous with the inner cylindrical surface 126 of the cyclone vessel 102. Moreover, the inlet nozzle 122 can have a second surface 128 substantially parallel and continuous with a cyclone roof 130 of the cyclone vessel 102, wherein the cyclone roof 130 forms part of the top head 107. Thus, the first surface 124 and the second surface 128 can each provide a smooth transition for any incoming fluid-particulate suspension from the inlet nozzle 122 to the inner cylindrical surface 126 and cyclone roof 130, respectively. As can be appreciated, other exemplary embodiments can include a substantially square-shaped inlet nozzle 122 having similar first and second surfaces 124,128, without departing from the scope of the disclosure.

In exemplary operation, a fluid-particulate suspension containing one or more solid particulates suspended in a fluid can enter the cyclone vessel 102 tangentially through the inlet nozzle 122 and swirl circumferentially against the inner cylindrical surface 126, thereby creating a centrally-located vortex of reduced solids content. In at least one embodiment, the fluid-particulate suspension can be introduced to the cyclone vessel 102 at elevated temperatures and pressures. For example, in one or more embodiments the incident pressures can range from a lower end of about zero psi, about 100 psi, about 200 psi, about 300 psi or about 400 psi to an upper end of about 500 psi, about 600 psi, about 700 psi, about 800 psi, about 900 psi or about 1000 psi. Further, the incident pressures can range from about 500 psi to about 900 psi, or from about 600 psi to about 800 psi, from about 700 psi to about 800 psi. The incident temperatures can range from a low end of about 100° F., about 200° F., about 300° F., about 400° F., about 500° F., about 600° F., about 700° F., about 800° F., about 900° F. or about 1000° F. to and upper end of about 1100° F., about 1200° F., about 1300° F., about 1400° F., about 1500° F., about 1600° F., about 1700° F., about 1800° F., about 1900° F. or about 2000° F. Further, that incident temperature can range from about 1500° F. to about 2000° F., about 1600° F. to about 1900° F., about 1700° F. to about 1800° F. or from about 1550° F. to about 1850° F. In other exemplary embodiments, the pressure within the cyclone vessel can reach ultrahigh pressures of greater than 1000 psi, such as 2000 psi, 3000 psi, 4000 psi, 5000 psi, 6000 psi and even up to about 7000 psi or more.

Once injected into the cyclone vessel 102, the suspended solid particulates can be immediately driven outward toward the inner cylindrical surface 126 by centrifugal forces. The disentrained particulates rapidly concentrate at the inner cylindrical surface 126 and gradually pass downward through the cyclone vessel 102 for downstream processing. At the same time, the separated fluid phase of decreasing particulate loading can eventually form a centrally-located vortex. From the vortex, a solids-lean fluid, such as gas or fuel, can exit via the outlet tube 105 to the outlet 106.

Figure 3:
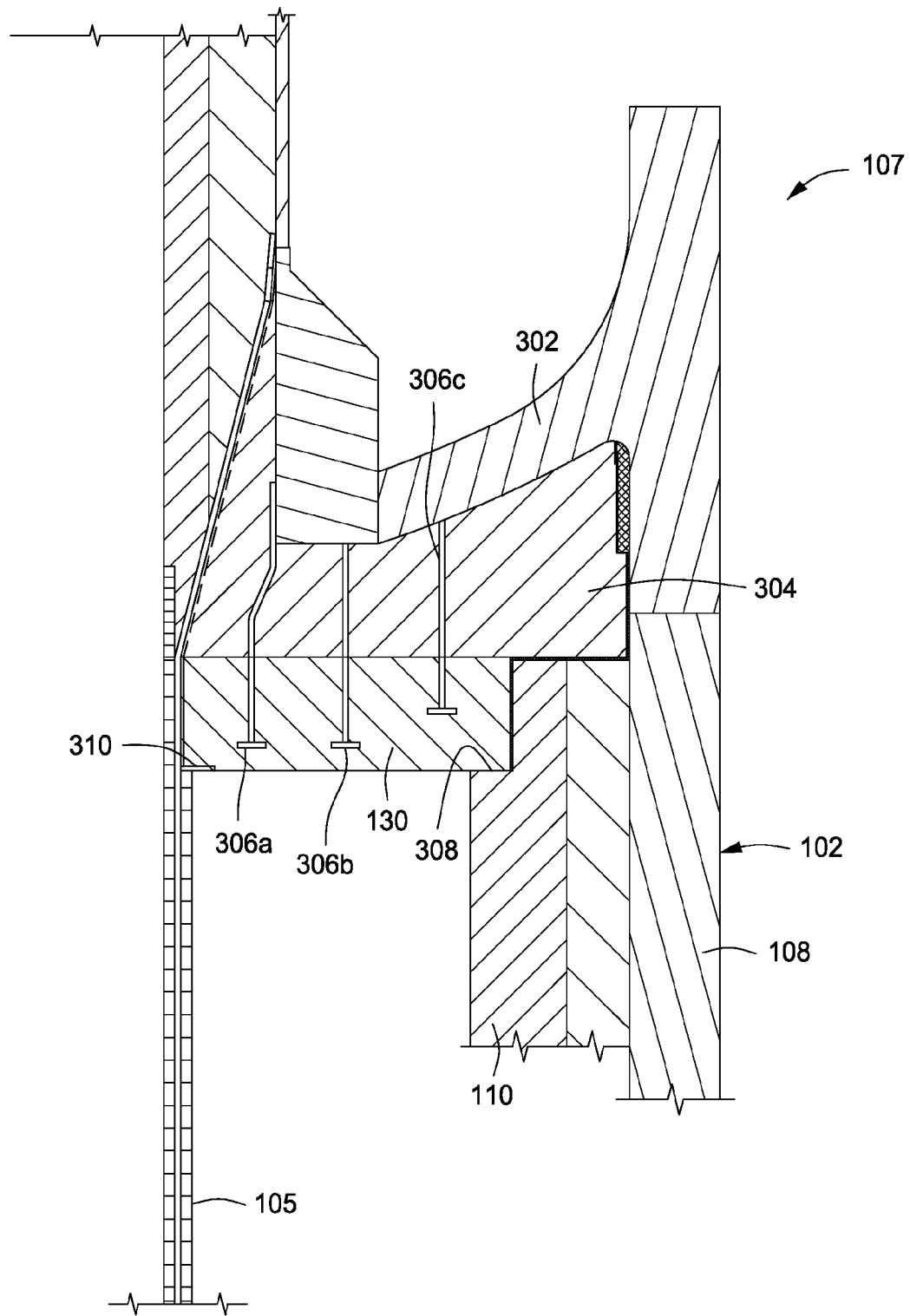
FIG. 3 depicts a portion of a top head as shown in FIG. 1, according to one or more embodiments of the disclosure.

Referring now to FIG. 3, illustrated is a portion of the top head 107, as indicated in FIG. 1. According to one or more embodiments of the present disclosure, the top head 107 can be circumferentially-disposed around and sealingly engaged with a portion of the outlet tube 105. In at least one embodiment, the top head 107 can include the cyclone roof 130, as discussed above, a concave casing 302, and a roof insulation layer 304 interposed therebetween. The cyclone roof 130 can include a dense layer refractory, such as RESCO® RS-88VC, and be configured to prevent erosion of the roof insulation layer 304. As described above, the cyclone roof 130 can also be configured to provide a flat surface substantially parallel and continuous with the second surface 128 of the inlet nozzle 122 (see FIGS. 1 and 2).

In one or more embodiments, the cyclone roof 130 can include a series of pie-shaped refractory bricks, circumferentially-surrounding the outlet tube 105 and interconnected with each other through, for example, a tongue-and-groove or keyed joint. In at least one embodiment, each pie-shaped refractory brick of the cyclone roof 130 may be coupled to and supported within the cyclone vessel 102 by one or more T-studs 306a,b,c cast directly into the bricks of the cyclone roof 130 and attached or otherwise coupled to the concave casing 302. In other embodiments, a shoulder 308 of the erosion resistant layer 110 and a ring 310, coupled or otherwise attached to the outlet tube 105, can provide further support for the cyclone roof 130 refractory bricks. In at least one embodiment, the ring 310 can be disposed circumferentially about the outlet tube 105 and made of an alloy, such as HAYNES® HR-120® (Haynes International).

The roof insulation layer 304 can serve as a back-up refractory layer to the cyclone roof 130 and further provide an insulating material. In at least one embodiment, the roof insulating layer 304 can include a thermal ceramic, such as KAOLITE® 2300 LI thermal ceramic, and can be installed by casting techniques.

In illustrative embodiments, the concave casing 302 can be inwardly-concave toward the interior of the cyclone vessel 102 but convex to the pressure, as typified by the Boiler and Pressure Vessel Code provided by ASME. The concave casing 302 can be welded, or otherwise attached by mechanical means, to the casing 108 of the cyclone vessel 102. As can be appreciated, employing the inwardly-concave casing 302 to the top head 107 takes advantage of the resilient structural properties of an arced member for use in high-pressure applications, whereas similarly-situated non-arced members (e.g., a flat member) would be unable to withstand the elevated pressures and would ultimately fail. Moreover, the concave casing 302 of the top head 107 can eliminate unneeded and process-inefficient voids created between the inlet 104 and the cyclone roof 130. Eliminating the void between the inlet 104 and the cyclone roof 130 can not only improve overall process efficiency, but can also result in a substantial cost savings in materials needed to fill or seal the void.

Figure 4:
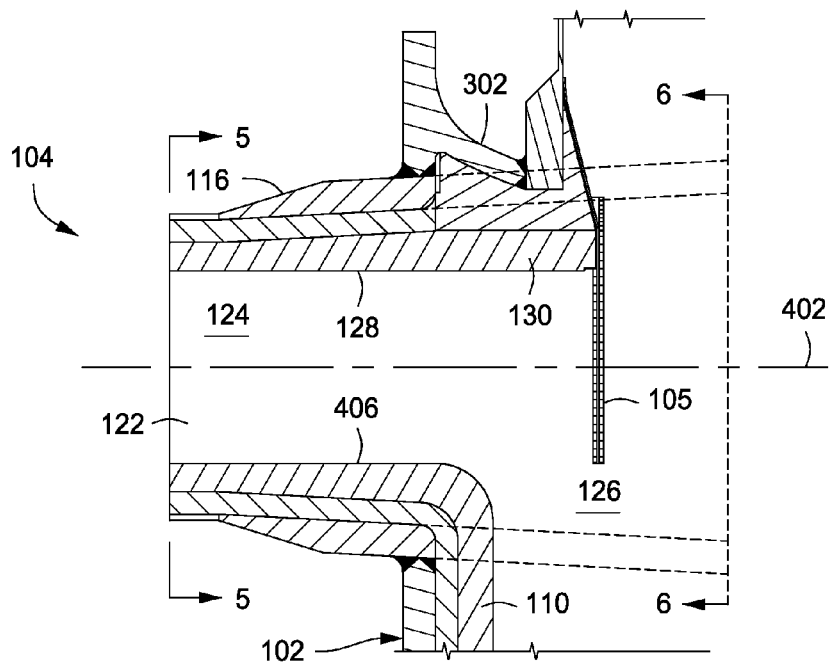
FIG. 4 depicts a side view of the cyclone inlet, according to one or more embodiments of the disclosure.
Figure 5:
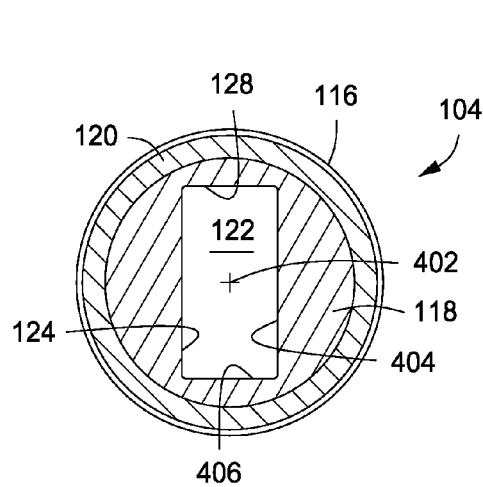
FIG. 5 depicts an end view of the cyclone inlet of FIG. 4 taken along the line 5-5 indicated in FIG. 4, according to one or more embodiments of the disclosure.
Figure 6:
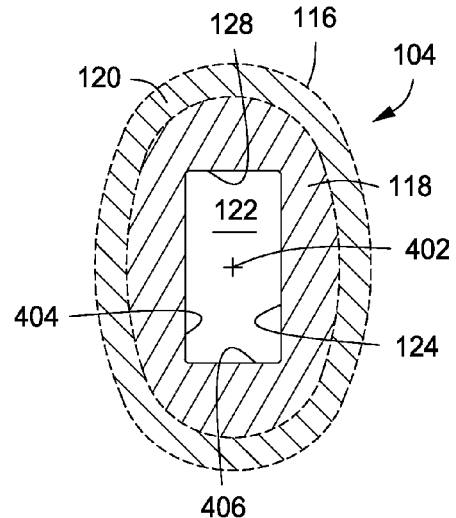
FIG. 6 depicts an opposing end view (with respect to the end view shown in FIG. 5) of the cyclone inlet of FIG. 4 taken along the line 6-6 indicated in FIG. 4, according to one or more embodiments of the disclosure.

Referring now to FIGS. 4-6, depicted is the inlet 104 of the cyclone vessel 102 and an exemplary structural transformation of the inlet casing 116 along the length of the inlet 104. As illustrated, the inlet 104 can include a longitudinal axis 402 along which the inlet nozzle 122 concentrically extends into the cyclone vessel 102. In at least one embodiment, the inlet nozzle 122 can be rectangular, but other embodiments can include a square-shaped inlet nozzle 122 or other polygonal shapes without departing from the scope of the disclosure. The inlet nozzle 122 can at least be configured to direct any incoming fluid-particulate suspension away from and/or around the outlet tube 105, thereby decreasing the potential of premature erosion on the surface of the outlet tube 105.

Furthermore, as described above with reference to FIGS. 1 and 2, the inlet nozzle 122 can include a first surface 124 and a second surface 128, wherein each surface 124, 128 provides a smooth transition from the inlet nozzle 122 to the inner cylindrical surface 126 and cyclone roof 130, respectively. In addition, the inlet nozzle 122 can include a third surface 404 and a fourth surface 406, where the third surface 404 faces the first surface 124 and the fourth surface 406 faces the second surface 128. In at least one embodiment, the third surface 404 can be configured to help direct the incoming stream of fluid-particulate suspension away from and/or around the centrally-located outlet tube 105. In one or more embodiments, the shape of the inlet nozzle 122 defined by its surfaces 124, 128, 404, 406, whether it be rectangular, square, or any other shape, can remain substantially constant along the length of longitudinal axis 402. In at least one embodiment, surfaces 124, 128, 404, 406 may merge together to form a substantially circular cross-sectional shape.

FIG. 5 depicts a view from a first end of the inlet 104 distal to the cyclone vessel 102, taken along line 5-5 as indicated in FIG. 4, and shows the inlet nozzle 122 encased by the inlet erosion resistant layer 118, the inlet insulating layer 120, and the inlet casing 116. FIG. 6 depicts a view from a second end of the inlet 104 proximal the cyclone vessel 102, taken along line 6-6 as indicated in FIG. 4, where the inlet 104 can be coupled to or otherwise attached to the cyclone vessel 102. In one or more embodiments, the inlet casing 116 can be generally circular in cross-section (FIG. 5) distal to the cyclone vessel 102, but may gradually transform in shape along the length of the longitudinal axis 402 and eventually transition into a generally elliptical, or oval-like cross-section (FIG. 6) at or near the cyclone vessel 102. The transformation of the inlet casing 116 from a generally circular shape into a generally elliptical shape along the longitudinal axis 402 can provide a tapered connection point configured to smoothly transition into the outer surface of the cyclone vessel 102.

As can be appreciated, the tapering transition of the inlet casing 116 can prove advantageous over applications employing a uniformly-cylindrical inlet casing which is difficult to smoothly transition to the cyclone vessel 102 for attachment without shifting the longitudinal axis 402 into the path of the downwardly-extending outlet tube 105. Such a shift in the longitudinal axis 402 would result in the direct impact of incoming particulates on the outlet tube 105, thereby prematurely eroding its surface, or would necessitate a repositioning of the outlet tube 105 within the cyclone vessel 102 to avoid direct particulate contact. Repositioning the centrally-located outlet tube 105, however, can have adverse effects on vortex efficiency and overall process efficiency.

Figure 7:
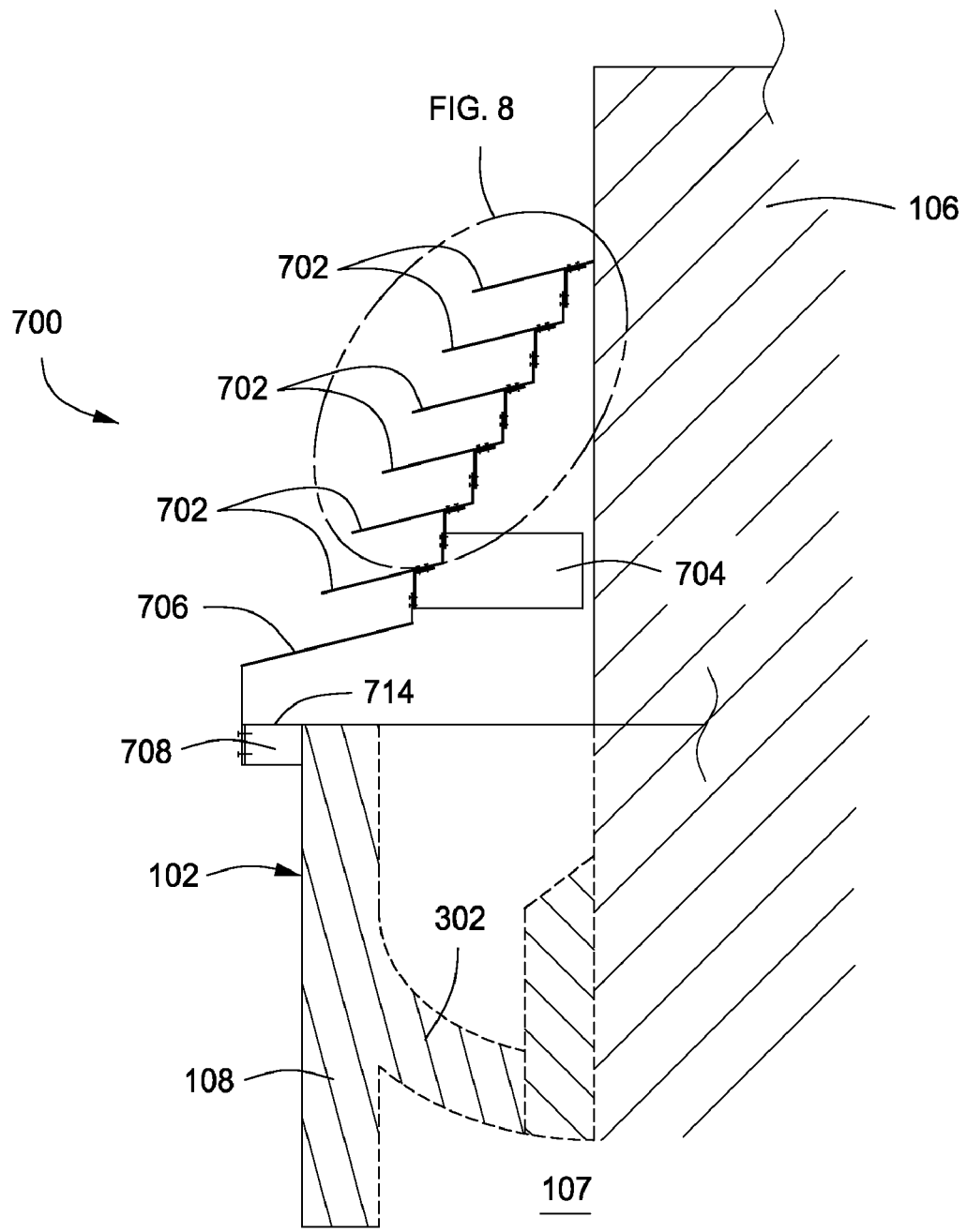
FIG. 7 depicts a portion of the top head with an exemplary rain shield disposed thereon, according to one or more embodiments of the disclosure.
Figure 8:
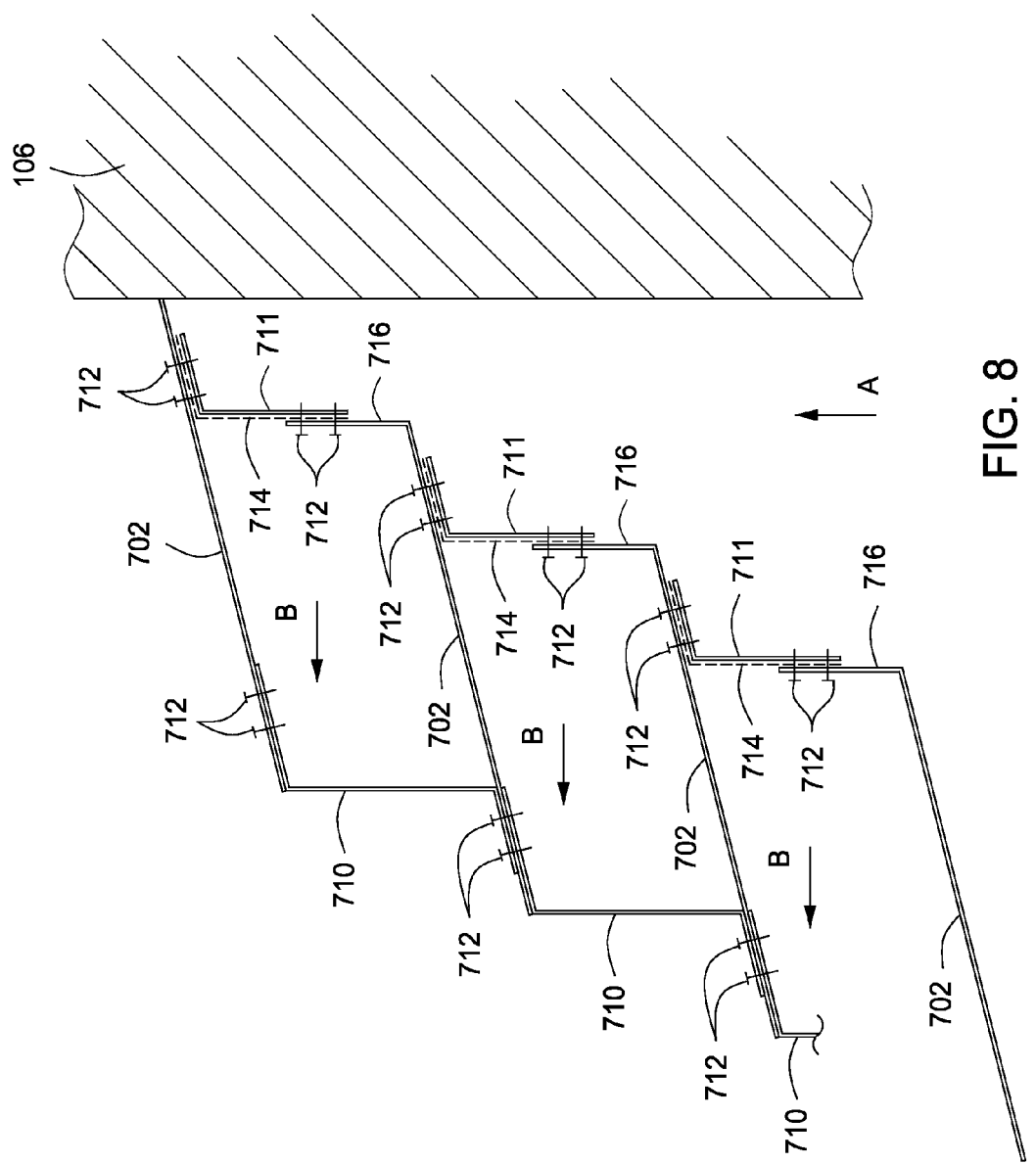
FIG. 8 depicts a magnification of the cap portions indicated in FIG. 7.

Referring now to FIGS. 7 and 8, depicted is an exemplary rain shield 700 that can be circumferentially-disposed around the outlet 106 of the cyclone 100 (FIG. 1) to prevent rainwater accumulation on the exterior of the top head 107 where the concave casing 302 is located. As illustrated in FIG. 7, the rain shield 700 can include a series of cap portions 702 horizontally-disposed from the outlet 106 at varying points along the length of the outlet 102. Although a certain number of cap portions 702 are illustrated herein, it is understood that such is merely by way of example, and not intended to limit the scope of the subsequently presented claims. Indeed, a greater or lesser number of cap portions 702 can be implemented to fit a particular application, without departing from the scope of the disclosure.

In one or more embodiments, each cap portion 702 can be configured to extend at least partially around the outlet 106 at a given point along its length with respect to the outlet 106. After extending partially around the outlet 106, the cap portion 702 can there be coupled or otherwise attached to another cap portion 702, and so on until the cap portions 702 extend completely around the outlet 106 at the given point. The same process can be undertaken at each elevation, as shown in FIG. 7. In at least one embodiment, the cap portion 702 can include two half-circle cap portions 702 that interconnect halfway around the outlet 106, thereby providing a full circular cap portion 702 at a given point. In another exemplary embodiment, the cap portion 702 can include a single circular length configured to extend completely around the circumference of the outlet 106.

The cap portions 702 can all generally be supported by a series of support plates 704 (only one shown), each support plate 704 being circumferentially-disposed around the exterior of the outlet 106. Although only one cap portion 702 at a given point may actually be coupled to a support plate 704, each cap portion 702 can be supported thereby through the internal support structure between each cap portion 702, as will be described below. In at least one embodiment, there can be about eight support plate(s) 704 coupled or otherwise attached to the exterior of the outlet 106. In one or more embodiments, the support plate(s) 704 can be welded to the exterior of the outlet 106. In other exemplary embodiments, the support plate(s) 704 can be mechanically or otherwise attached to the exterior of the outlet 106.

Also coupled to the support plate(s) 704 can be a finish cap 706. Similar to the construction of the cap portions 702, the finish cap 706 can include one or more portions configured to extend at least partially around the outlet 106 and there be coupled or otherwise attached to another portion of the finish cap 706, and so on until the finish cap 706 extends completely around the outlet 106. In at least one embodiment, the finish cap 706 can include two half-circle finish cap 706 portions that interconnect halfway around the outlet 106, thereby providing a full circular finish cap 706. In other embodiments, the finish cap 706 can include a single portion that extends completely around the circumference of the outlet 106.

In an exemplary embodiment, the finish cap 706 can also be coupled to a series of finish support plates 708 (only one shown), which can be coupled to or otherwise attached to the vessel casing 108. In one or more embodiments, the finish support plates 708 can be circumferentially-disposed around the vessel casing 108 and either welded or mechanically or otherwise attached thereto. In at least one embodiment, there can be about sixteen finish support plates 708 circumferentially-disposed around the exterior of the vessel casing 108 and configured to provide support to the finish cap 706.

Referring to FIG. 8, illustrated is a magnified view of a section of the cap portions 702 as indicated in FIG. 7. In an exemplary embodiment, each cap portion 702 can be supported by rigid straps 710 coupled at an end distal to the outlet 106, and also supported by rigid straps 711 coupled at an end proximal to the outlet 106. As illustrated, the rigid straps 710, 711 can be bent or otherwise shaped to be coupled to the bottom of one cap portion 702 and to the top of the subsequent cap portion 702, in a generally descending direction. At least one rigid strap 710 can be coupled to the bottom of the bottom-most cap portion 702 and also to the top of the finish cap 706 (not shown).

In an exemplary embodiment, the rigid straps 710, 711 can include a thin strip of rigid material, such as a strip of stainless steel or aluminum, but can also include a strip of other rigid materials, such as plastics or other metals. In at least one embodiment, the rigid straps 710, 711 can be about one inch in width, but other exemplary embodiments can include rigid straps 710, 711 of varying widths to suit a particular application. In one or more embodiments, a plurality of the rigid straps 710, 711 can be spaced equidistantly around the outlet 106, thereby providing support to the several cap portions 702. In at least one embodiment, the rigid straps 710, 711 can be spaced on about six inch centers at the periphery of the cap portions 702 around the outlet 106. As illustrated, the rigid straps 710, 711 can be coupled to the cap portions 702 and finish cap 706 by mechanical means, such as self-tapping screws 712. One of skill in the art would, however, appreciate that the rigid straps 710, 711 may be coupled by any available means without departing from the scope of the invention.

In an exemplary embodiment, portions of a screen material 714 can also be disposed around the outlet 106 to prevent the influx of animal life, such as birds and other foreign matter, into the exterior of the top head 107 where the concave casing 302 is located. In at least one embodiment, the screen material 714 can be a wire mesh, but can also be made of other materials, such as plastics. As illustrated, the screen material 714 can be interposed between the cap portions 702 and the rigid straps 711, and coupled or attached thereto by a coupling means, such as the self-tapping screws 712. As shown in FIG. 7, the screen material 714 can also be used in conjunction with the interconnection of the finish cap 706 and the finish support plated 708, thereby providing a barrier configured to prevent the influx of animals and other foreign matter up through the bottom of the finish cap 706.

At least some of the cap portions 702 can include a lip section 716 configured to prevent the influx of rain into the exterior of the top head 107. For example, the lip sections 716 can be configured to stop blowing rain, which may enter at a substantially 90° angle with respect to horizontal. The remaining portion of the cap portions 702 can be generally disposed at a decline with respect to horizontal, thereby allowing any accumulated precipitation to drain from the rain shield 700.

In an exemplary embodiment, the rain shield 700 can also provide a heat-dissipative effect for the cyclone vessel 102. In exemplary operation, heat rising from the cyclone vessel 102 in the direction of arrow A (FIG. 8) can be emitted via the open spaces between vertically-adjacent cap portions 702 in the direction of arrows B by means of convection. To accomplish this in a more efficient manner, the cap portions 702 can be vertically-offset from each other by progressively smaller distances corresponding to the vertical point of the outlet 106. In other words, the higher the vertical position on the outlet 106, the smaller the outlet between adjacent cap portions 702. As can be appreciated, progressively smaller outlet paths can force more heat out the lower and larger outlet paths by means of convective air currents, thereby allowing a greater amount of heat to escape with little or no restriction.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A cyclonic separator, comprising:
a cyclone vessel having an inlet coupled thereto, the inlet configured to receive a particulate-fluid suspension comprising a fluid and at least one solid particulate suspended therein;
an outlet tube mounted within the cyclone vessel and configured to remove the fluid separated from the particulate-fluid suspension separated fluids from the cyclone vessel;
a concave top head coupled to the cyclone vessel and circumferentially-disposed about the outlet tube, the concave top head comprising a substantially flat cyclone roof disposed in an interior of the cyclone vessel; and
an inlet nozzle disposed within the inlet and having a first surface and a second surface, wherein the first surface smoothly transitions to an inner cylindrical surface of the interior of the cyclone vessel and the second surface smoothly transitions to the substantially flat cyclone roof.

2. The cyclonic separator of claim 1, wherein the cyclone vessel is a cylindrical pressure-vessel configured to withstand internal pressures ranging from about 50 psi to about 800 psi.

3. The cyclonic separator of claim 1, wherein the inlet is tangentially-coupled to the cyclone vessel.

4. The cyclonic separator of claim 3, wherein the inlet comprises an inlet casing disposed around a length of the inlet nozzle, the inlet casing having a first end distal the cyclone vessel and a second end at or near the cyclone vessel, wherein the first end has a circular cross-section that transforms along the length of the inlet nozzle into an elliptical cross-section at the second end.

5. The cyclonic separator of claim 1, wherein the inlet nozzle is rectangular.

6. The cyclonic separator of claim 1, wherein the substantially flat cyclone roof comprises a series of pie-shaped refractory bricks.

7. A method of separating solid particulates from a particulate-fluid suspension, comprising:
introducing the particulate-fluid suspension into a cyclone vessel via an inlet tangentially-coupled thereto, wherein the inlet comprises an inlet nozzle having a first surface tangent to an inner cylindrical surface of the cyclone vessel and a second surface substantially parallel to and continuous with a cyclone roof of a concave top head of the cyclone vessel and the particulate-fluid suspension comprises a fluid and at least one solid particulate suspended therein;
creating a vortex within the cyclone vessel to drive the solid particulates toward the inner cylindrical surface and produce a reduced particulate loading particulate-fluid suspension; and
removing the reduced particulate loading particulate-fluid suspension from the cyclone vessel through an outlet tube disposed within the cyclone vessel.

8. The method of claim 7, further comprising operating the cyclone vessel at pressures ranging from about 50 psi to about 800 psi.

9. The method of claim 7, further comprising:
disposing an inlet casing around a length of the inlet nozzle;
transitioning the inlet casing from a circular cross-section at a first end of the inlet casing to an elliptical cross-section at a second end of the inlet casing along the length of the inlet nozzle; and
coupling the second end of inlet casing having the elliptical cross-section to the cyclone vessel.

10. The method of claim 7, wherein the inlet nozzle is rectangular.

11. The method of claim 7, wherein the cyclone roof is substantially flat.

12. The method of claim 11, wherein the cyclone roof comprises a series of pie-shaped refractory bricks configured to circumferentially-surround the outlet tube.

13. A pressure cyclone, comprising:
a vessel having a concave top head, wherein the concave top head comprises a substantially flat roof disposed in an interior of the vessel;
an inlet tangentially coupled to the vessel;
an inlet nozzle disposed within the inlet and having a first surface and a second surface, wherein the first surface is tangent to an inner cylindrical surface of the interior of the vessel and the second surface is parallel to and continuous with the substantially flat roof;
an inlet casing disposed around a length of the inlet nozzle, the inlet casing being configured to transition from a circular cross-section at an end distal the vessel to an elliptical cross-section at an end proximal the vessel along the length of the inlet nozzle, and couple to the vessel at the proximal end with the elliptical cross-section; and
an outlet tube disposed within the vessel and sealingly coupled to the concave top head.

14. The pressure cyclone of claim 13, wherein the vessel and concave top head are configured to withstand pressures ranging from about 50 psi to about 800 psi.

15. The pressure cyclone of claim 13, wherein the concave top head further comprises a concave casing and a roof insulation layer, wherein the roof insulation layer is interposed between the concave casing and the substantially flat roof.

* * * * *